United States Patent [19]

Bunn

[11] 4,180,976
[45] Jan. 1, 1980

[54] SIPHON MOTOR

[76] Inventor: Carl H. Bunn, P.O. Box 576, Myrtle Point, Oreg. 97458

[21] Appl. No.: 900,570

[22] Filed: Apr. 27, 1978

[51] Int. Cl.² .............................................. F15B 21/00
[52] U.S. Cl. ........................................ 60/325; 60/327; 137/123; 290/43
[58] Field of Search ................. 60/325, 327, 398, 721; 137/123, 132, 142; 290/43, 54

[56] References Cited

U.S. PATENT DOCUMENTS 2,959,184 11/1960 Mahan ............................ 137/142 X

*Primary Examiner*—Edgar W. Geoghegan
*Attorney, Agent, or Firm*—Clarence A. O'Brien; Harvey B. Jacobson

[57] ABSTRACT

A siphon motor comprising the combination of siphon means and generating means for generating electrical energy from a water source located below the generating means and a water discharge at a lower level than the water source. Water rises by siphonic action upward from the water source to a sealed working region maintained under partial vacuum, and descends to the water discharge. The working region contains the generating means. The system has particular utility as a source of power generation in remote locations having a water table within about 30 feet of the ground.

8 Claims, 2 Drawing Figures

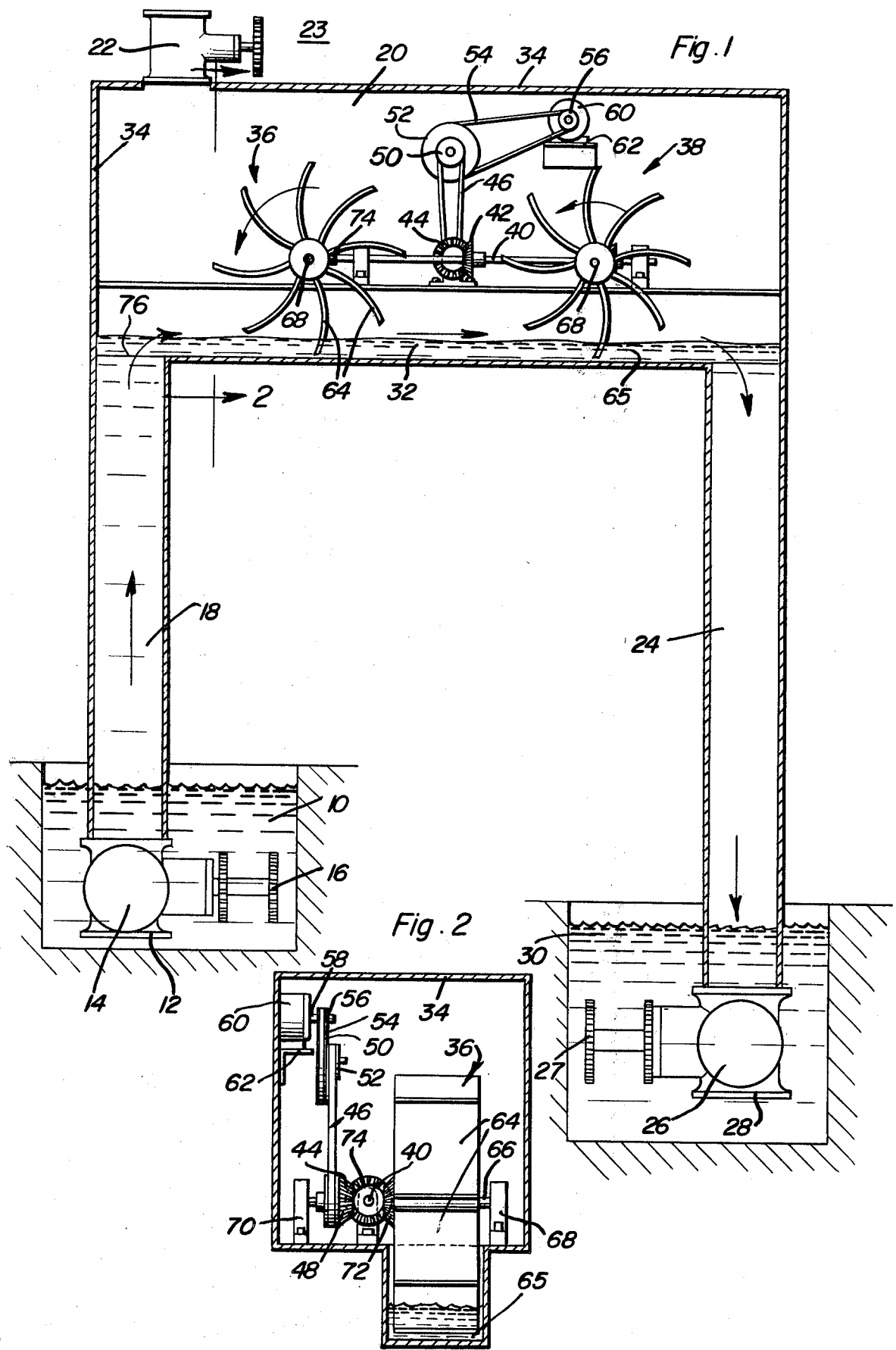

SIPHON MOTOR

BACKGROUND OF THE INVENTION

1. Field of the Invention

The invention relates to a siphon motor for generation of electrical power utilizing energy derived from the flow of water from a higher to a lower level, where both the higher and lower levels are located below the siphon motor and associated actuating components. The generator is powered by water lifted from the water source by siphonic action to water wheels connected to the generator, the water then descending downwardly to the water discharge.

2. Description of the Prior Art

It is known to utilize non-conventional sources of energy for producing a power output. For example, U.S. Pat. No. 4,022,024 to Abeles, discloses a thermosiphon engine, while U.S. Pat. No. 4,022,025 to Greene, discloses a geothermal flow utilized to produce a power output. In addition, U.S. Pat. No. 1,730,578 to Lawaczeck shows power generation through flow of water directly from an upper level reservoir to a lower level.

These and other patents illustrating devices which produce power output from non-conventional sources demonstrating the state of the prior art are the following: U.S. Pat. Nos. 2,755,619—July 24, 1956; 3,998,056—Dec. 21, 1976; 4,019,325—Apr. 26, 1977.

None of the patents found, however, taps as a new source of energy the energy stored within underground water sources having a discharge point below the level of the underground source. In remote locations where such underground water sources are the only practical energy source, the present invention represents a practical means of power generation. Furthermore, none of the references discloses the incorporation of a water wheel or turbine in a siphon flow line.

SUMMARY OF THE INVENTION

It is accordingly an object of the present invention to provide an energy source, particularly for use in remote locations, utilizing a water wheel or turbine in a siphon flow line connecting a water source below the water wheel or turbine with a water discharge point located at a greater depth below the water wheel or turbine than the water source.

A further object of the invention is to provide a power output by association of a generating means with such a water wheel or turbine.

Still another object of the invention is to provide a siphon motor whose operation is observable through clear plastic components.

Yet another object of the invention is to provide a power generating system comprising a plurality of generating assemblies associated with such a siphon line.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a longitudinal, sectional view passing through a water source below grade and a water discharge below grade, showing the arrangement of the siphon system and generating assembly of the present invention.

FIG. 2 is a transverse, sectional view taken substantially upon a plane passing along section line 2—2 on FIG. 1 showing details of a part of the generating assembly.

DESCRIPTION OF THE PREFERRED EMBODIMENT

In FIG. 1, water enters the system at source 10 through inlet 12 of inlet valve 14, which is opened or closed by handle 16. Included within inlet valve 14 is a strainer mechanism (not shown) for removing foreign objects from water at source 10. Water in inlet column 18 travels upwardly in the direction indicated by arrows in FIG. 1 due to the force exerted on water in source 10 and the reduced pressure within working region 20 of the apparatus, such reduced pressure initially resulting from connection of a vacuum pump (not shown) through valve 22 communicating to working region 20 from the outside 23. Reduced pressure in working region 20 is maintained thereafter by the weight of water in outlet column 24, from which it passes through outlet valve 26, which is opened or closed by handle 27, through outlet 28 to water discharge 30. As long as the difference in water height between water in siphon channel 32 and water source 10 is no greater than the height which generates a pressure equal to atmospheric pressure, namely, about 30 feet, a continuous flow of water from inlet column 18 into siphon channel 32 and down outlet column 24 will occur according to well-known principles of siphon action. Sealed system walls 34 insure no leakage of air into working region 20, thereby maintaining reduced pressure in working region 20 sufficient to lift water through inlet column 18 in continuous fashion. In the course of its flow through siphon channel 32, water turns water wheels 36 and 38, said rotary motion being transmitted to shaft 40 by gearing means shown in FIG. 2, and thence through bevel gear 42 to perpendicularly oriented bevel gear 44, which transmits rotary motion to belt 46 through sheave 48. Belt 46 transmits rotary motion to flywheel 50 through sheave 52, and belt 54 transmits rotational energy to sheave 56 on shaft 58 of generator 60, mounted upon generator mount 62. Water wheels 36 and 38 are each constructed of a plurality of paddles 64. The pressure in working region 20 is regulated through valve 22 to control the level of water in siphon channel 32. By way of example, if the height from water source 10 to the water level in siphon channel 32 is approximately 15 feet, or half that distance which generates a pressure equal to atmospheric pressure, the pressure required in working region 20 is approximately 0.5 atmosphere. It is to be understood that the precise adjustment of water level in siphon channel 32 will depend upon certain variables, such as atmospheric pressure and the level of water in water discharge 30, as well as the rate of flow in siphon channel 32, which will vary with the construction and number of water wheels placed in siphon channel 32.

FIG. 2 shows additional details of construction, including paddles 64 of water wheel 36, shaft 66 upon which water wheel 36 rotates, water wheel shaft mounts 68 and 70, having a bearing surface (not shown) to receive shaft 66, bevel gear 72, turning with shaft 66 and engaging bevel gear 74, which turns shaft 40. Behind bevel gear 74 and not shown in FIG. 2 is bevel gear 42, turning on shaft 40 and engaging bevel gear 44, which in turn is connected through flywheel 50 with generator 60 in the manner described above.

In operation, water wheels 36 and 38 are submerged just far enough for paddles 64 to operate water 65 flowing in siphon channel 32. The upper parts of wheels 36 and 38 are surrounded by air at reduced pressure, made possible by pumping means connected to the apparatus through valve 22 or by siphon action. The system can be initially placed in operation by priming, instead of by use of pumping means connected through valve 22. Priming is accomplished by closing inlet valve 14 and outlet valve 26, filling inlet column 18 and outlet column 24, as well as a portion of working region 20 with water, and opening valves 14 and 26.

A portion or all of sealed walls 34 can be manufactured from clear plastic to permit visual observation of the complete working of the system. Any number of wheels can be installed in siphon channels, and any number of siphon channels can be used to bring the water from its highest point at the head 76 of inlet column 18 into outlet column 24.

The invention has particular utility in remote or sparsely populated locations, particularly arid regions with the water table within about 20 feet of the ground surface and appropriately located discharge point. The apparatus could be used in caves, on waterfalls, in remote locations having small streams, and on small dams. The invention is operable with relatively small differences in height of fall.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The combination of siphon means and generating means, said siphon means including water source below said generating means, a water discharge at a lower level below said generating means than the water source, an inlet column between said water source and a siphon channel, an outlet column between said siphon channel and the water discharge, said generating means comprising a water wheel in mechanical engagement with an electrical generator, said water wheel being rotatable by water flowing from said inlet column through said siphon channel to said outlet column, said generating means and said siphon means being sealingly enclosed by walls defining a working region at less than atmospheric pressure.

2. The combination of claim 1 wherein said generating means comprises a plurality of water wheels connected by gearing means to a common shaft, said shaft being connected in mechanical engagement with said generator.

3. The combination of claim 2 wherein said shaft is connected by a bevel gear arrangement to a flywheel, and said flywheel is connected mechanically to said generator.

4. The combination of claim 3 together with a pumping valve connected to a pump for pumping of air from said working region.

5. The combination of claim 4, together with an inlet valve and strainer located within the inlet valve, said inlet valve being located within said water source, and an outlet valve located within said water discharge.

6. A method of operating the combination of claim 5 comprising the steps of opening said inlet valve and said outlet valve, removing air from said working region through said pumping valve sufficient to raise a column of water through said inlet column into said siphon channel, and removing electrical power generated from said generator.

7. A method of operating the combination of claim 5 comprising the steps of closing said inlet valve, said outlet valve, and said pumping valve, filling said inlet column, said outlet column, and said siphon channel with water, opening said inlet valve and said outlet valve and removing power generated from said generator.

8. The combination of claim 1 wherein at least a portion of said walls is made of clear plastic, whereby visual observation of the combination is permitted.

* * * * *